Sept. 21, 1926. 1,600,428

L. ROBINSON

GROUND ANCHOR

Filed Oct. 9, 1925

INVENTOR
LUMLEY ROBINSON
BY
ATTORNEY

Patented Sept. 21, 1926.

1,600,428

UNITED STATES PATENT OFFICE.

LUMLEY ROBINSON, OF GILLINGHAM, ENGLAND.

GROUND ANCHOR.

Application filed October 9, 1925, Serial No. 61,417, and in Great Britain February 7, 1925.

This invention relates to ground anchors and has for its primary object to facilitate the insertion and removal of such anchors from the ground.

According to this invention a ground anchor is provided with one or a number of blades each mounted to turn about an axis transverse to the shank, a stop associated with the shank for engaging the blade or blades in spread position and means operated from a distance for removing the stop from engagement with the blade or blades when it is desired to remove the anchor from the ground.

The shank may be rotatably mounted within a head carrying the blades and the stop may be moved by the rotation of the shank.

A cam may be attached to the shank so as to lie between the blades in their closed position whereby the blades may be spread by rotating the shank.

An example of construction according to the invention will now be described with reference to the accompanying drawing wherein—

Figures 1, 2:
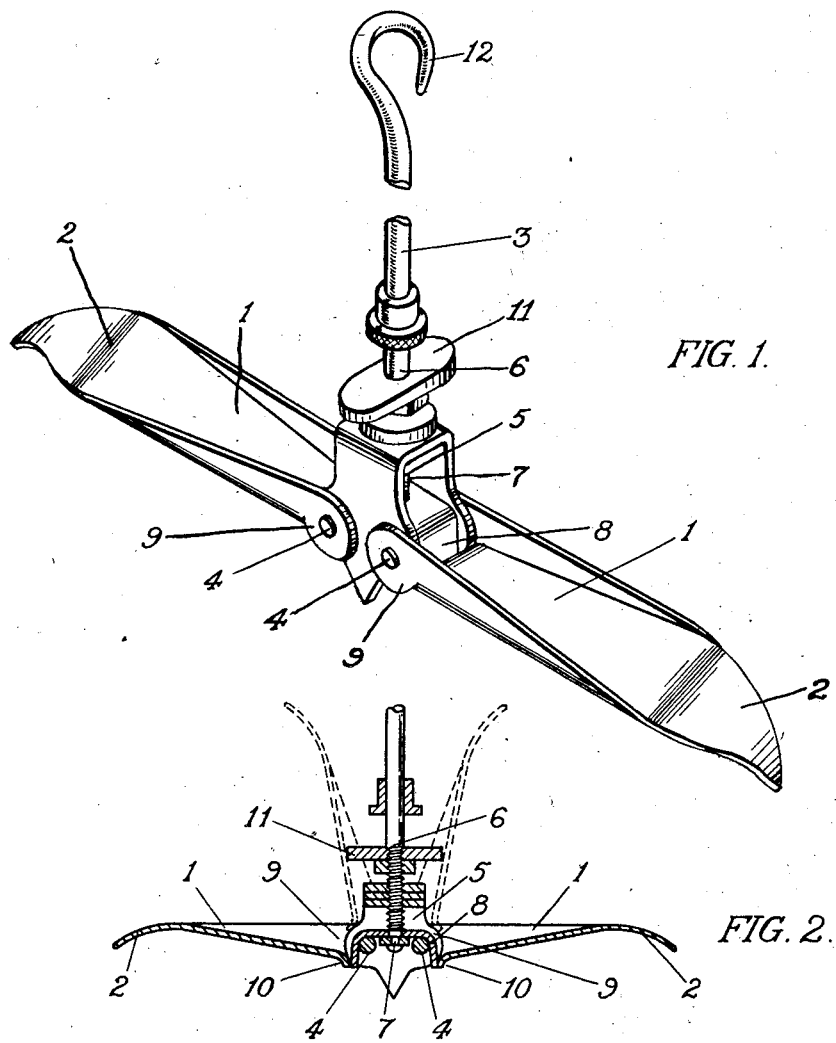
Fig. 1 is a side view showing the blades in the spread position.
Fig. 2 is a similar view in cross-section.

The blades 1 having their ends 2 bent away from the shank 3 are freely pivoted at 4 upon an inverted U-shaped head 5. The shank 3 has a threaded portion 6 screwing through a tapped hole in the bridge piece of the head 5, and its end 7 is swivelled to an inverted U-shaped stop 8 which is slidably mounted within the arms of the head 5 with its sides at right angles to the sides of the head. The inner ends 9 of the blades 1 are forked so as to embrace the sides of the head 5, and the bottoms of these forks are formed with lugs 10 for engagement with the sides of the stop 8. A transverse elliptical member 11 is connected to the shank 3 so as to lie between the blades when closed. The upper end of the shank is formed as an eye 12.

In operation, a hole having been formed in the earth, the anchor is adjusted so that the shank is screwed into the inverted U-shaped head 5 as far as possible and with the elliptical transverse member lying parallel to the blades.

In this position the anchor is forced into the hole and the shank is given a half turn so as to press the blades slightly outwards into the earth at the sides of the hole. By pulling the shank, the blades are forced farther outwards into the earth until the lugs at the bases of their forks abut against the sides of the U-shaped stop and the blades are thus held at right angles to the shank.

When it is desired to withdraw the anchor, the shank is screwed out as far as it will come, and by pulling upon it the blades are caused to fold or trail back below the rod and pass readily out of the ground.

What I claim is:

1. In an earth anchor, the combination of a rotary shank, a head adjustable axially of said shank by rotary movement thereof, blades pivoted on said head and operating to swing about their pivots by axial movement of the shank and head, and a stop carried by the shank and operating into and out of engagement with the blades in spread position.

2. In an earth anchor, the combination of a rotary shank, a head adjustable axially of said shank by rotary movement thereof, blades pivoted on said head and operating to swing about their pivots by axial movement of the shank and head, a stop movable with the shank and operating into and out of engagement with the blades in spread position, and means rigid on the shank and operating by rotary movement thereof to initially separate the blades when in closed position adjacent the shank.

3. In an earth anchor, the combination of a rotary shank, a head adjustable axially of one end of the shank by rotary movement thereof, blades pivoted on the head and operating to swing about their pivots when the head is adjusted relatively to and with the shank, and a cam rigid on the shank above the head and operating with the movement of the shank to initially spread the blades.

4. In an earth anchor, the combination of a rotary shank having a threaded end portion, an inverted U-shaped head adjustable axially of the shank over the threaded portion thereof, and having an inverted U-shaped stop member arranged transversely of the sides of the head and loosely carried at the end of the shank, blades pivoted on said head and capable of movement through arcs of substantially 180°, the stop operating into and out of the path of the blades in spread position, and a cam rigid on the shank above the head and operating by a quarter turn of the shank to initially separate the blades from closed position adjacent the shank.

LUMLEY ROBINSON.